United States Patent
Frese et al.

(10) Patent No.: US 6,561,519 B1
(45) Date of Patent: May 13, 2003

(54) DUAL SEAL

(75) Inventors: Christopher C. Frese, Gainesville, GA (US); Tigree M. Butcher, Cleveland, GA (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 09/709,013

(22) Filed: Nov. 8, 2000

(51) Int. Cl.$^7$ ................................................. F16J 15/32
(52) U.S. Cl. ....................... 277/549; 277/552; 277/562; 277/563
(58) Field of Search ................................ 277/500, 549, 277/552, 562, 563

(56) References Cited

U.S. PATENT DOCUMENTS

| | | | | |
|---|---|---|---|---|
| 3,889,780 A | * | 6/1975 | Dison | 184/109 |
| 4,081,218 A | * | 3/1978 | Gabriel | 277/551 |
| 4,550,920 A | * | 11/1985 | Matsushima | 277/559 |
| 5,009,435 A | * | 4/1991 | Villanyi et al. | 277/552 |
| 5,199,718 A | * | 4/1993 | Niemiec | 277/552 |
| 6,196,551 B1 | * | 3/2001 | Zellers | 277/402 |
| 6,293,558 B1 | * | 9/2001 | Crapart | 277/551 |

* cited by examiner

Primary Examiner—Anthony Knight
Assistant Examiner—E Peavey
(74) Attorney, Agent, or Firm—MacMillan, Sobanski & Todd, LLC

(57) ABSTRACT

A pair of spaced apart radial shaft seals are held together by an interlocking pair of support members. The support members form an inner cavity which is in flow communication with the annulus between the shaft seals and the shaft. The inner cavity is vented to the atmosphere by means of a partial hole formed in the outer diameter portion of the support members. Any fluid that accumulates between the seals in the annulus is permitted to drain out through the inner cavity and the vent hole. The vent hole also prevents the formation of a vacuum in the annulus during operation. A channel between the support members is in flow communication with the annulus.

19 Claims, 1 Drawing Sheet

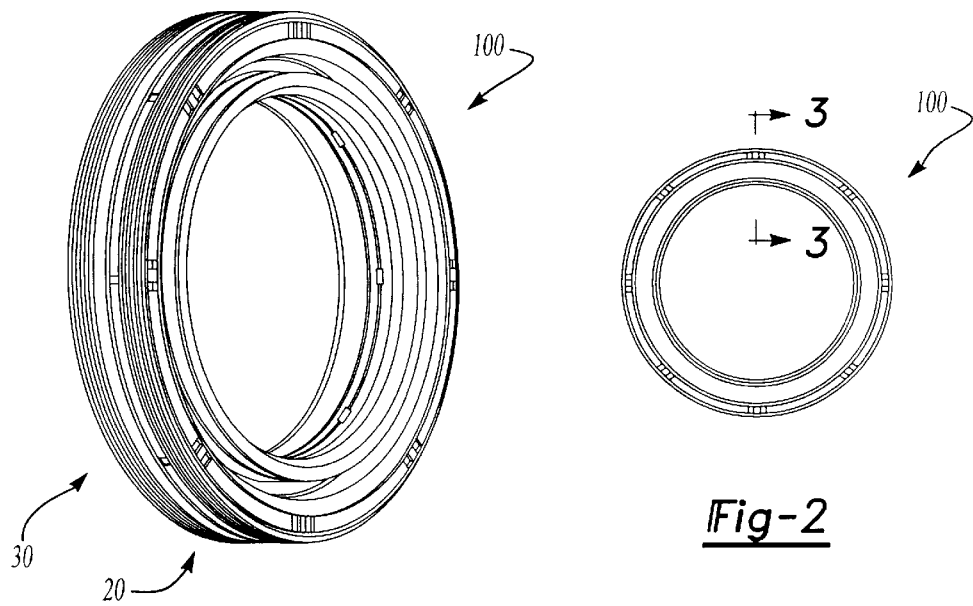
Fig-1
Fig-2
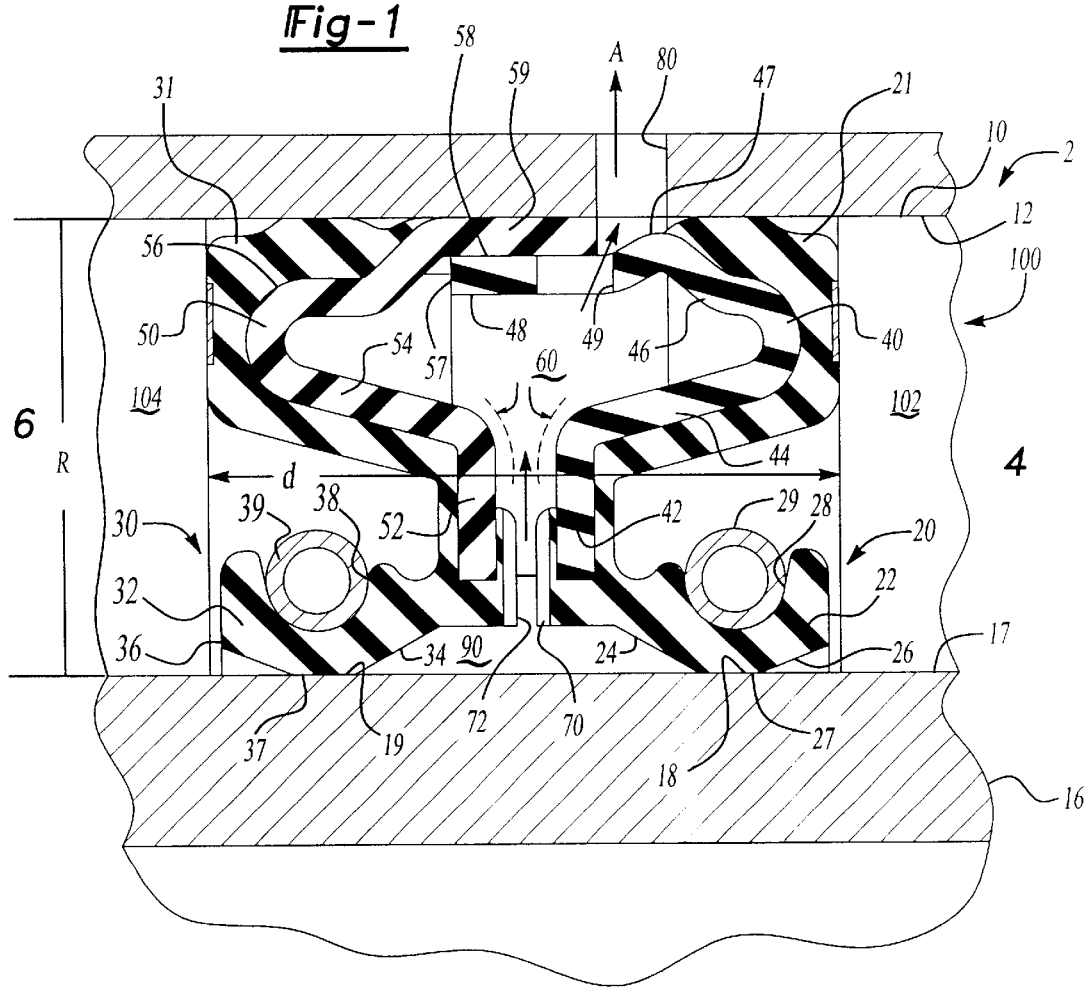
Fig-3

DUAL SEAL

FIELD OF THE INVENTION

This invention relates to dynamic sealing of a shaft and more particularly to a pair of shaft seals with a vent to remove any accumulated fluid between the pair of shaft seals and to prevent the formation of vacuum between the seals and the shaft.

BACKGROUND OF THE INVENTION

A transfer case connects a transmission with a drive axle for four wheel drive applications or other applications requiring the separation of two fluids. One solution used to solve this problem involves using two different radial shaft seals which are installed around the shaft. If one of the seals fails, fluid accumulates in a cavity between the seals and vents out a hole placed between the seals in the outer periphery of the housing. This solution presents several problems. These include the need to correctly install both seals, the attendant time to install the two seals and the possibility of inconsistent seal depth which may block the vent hole in the housing.

Another solution uses a single metal support structure with a rubber shaft seal with two sprung lips and the outer periphery of the metal structure is partially coated with rubber or alternatively uncoated. This design is prone to cocking in assembly, the formation of a vacuum condition between the two sprung lips and the accumulation of the two fluids between the seals after the seals wear in, or the potential transfer of one fluid to the other fluid which may accelerate failure of the transfer case or the transmission.

Still another solution that has been proposed to solve this problem is to form a dual seal with a venting/drain capability. This design provides a cavity between two L-shaped support members each of which supports a sprung lip seal. The design is also prone to cocking and has a tendency for the seals to be pushed together, preventing the design from draining or venting. Also, this seal design is not compact which is a disadvantage when space is at a premium.

Thus, there remains a need to provide a compact, easily installed dual seal that can be installed in either direction, and that can provide for a controlled radial height to aid in the installation of the seal and assure flow communication between the seals to atmosphere.

SUMMARY OF THE INVENTION

The present invention seeks to solve these problems by providing a pair of spaced apart shaft seals in a pair of support members that are connected to form a positive radial engagement surface. The pair of support members also form an internal cavity that is in flow communication with the annulus formed between the pair of seals and through a channel member and the shaft in order to vent to atmosphere. At least one hole at the interface between the pair of seals prevents blocking of the vent in the drain to atmosphere.

The present invention is directed to a dual seal for a shaft. The dual seal includes a first support member and a second support member. A first shaft seal member is adjacent to the first support member. The first and second support members having portions forming an inner cavity and at least one channel in flow communication with the cavity. The second shaft seal member is adjacent to the second support member. The first and second shaft members form an annulus between the first and second sealing members and the shaft. The annulus is in flow communication with at least one hole formed between the first and second seals so that at least one hole permits any accumulated fluid between the first and second shaft seal members to drain into the inner cavity, to prevent the formation of a vacuum in the annulus, and to prevent blocking at least one hole formed between the first shaft seal member and second shaft seal member.

It is an object of the present invention to provide a pair of shaft seal members with a hole between them to prevent the seals from restricting flow out of the annulus.

It is another object of the present invention to provide a compact and easily installed dual seal which keeps two fluids separated and vents vacuum and drains fluid in the annulus between the pair of seals to the atmosphere.

It is still a further object of the present invention to provide positive outer radial interlock of the two support members to maintain radial assembly height and to provide a positive stop for the dual seal during installation.

These and other features of the present invention will become apparent from the subsequent descriptions and drawings.

BRIEF DESCRIPTION OF THE DRAWINGS

FIG. 1 is a perspective view of the dual seal according to the present invention; and FIG. 2 is a side view of the dual seal according to the present invention; and FIG. 3 is a cross sectional view along 3—3 of FIG. 2.

DETAILED DESCRIPTION OF THE EMBODIMENTS

It is customary in sealing technology to use the expression "axially inward" to mean the direction toward the sealed region. Additionally, the expressions "fluid" and "air" side of a seal mean the sides facing toward or away from the sealed or fluid containing area of the device. Typically, elastomeric sealing lips or radial shaft seals include a seal band which is formed along a generally circular path between the air and oil side. The sealed region generally contains oil, grease or the like lubricating fluid, either in liquid or vapor form or both, confined by the seal band.

The annular dual seal made according to the present invention seals against a shaft 16 in two locations, as shown in FIG. 3. The shaft 16 is disposed in a housing 10 in a machine member 2 which is used to locate the dual seal 100. Each of the sealing lips acts radially inwardly against a seal band on the shaft 16. The first shaft seal 20 seals against a first fluid 4 and the second shaft seal 30 seals against a second fluid 6 which may be different than the first fluid 4.

As shown in FIGS. 1–3, the annular dual seal device according to the invention is designated by the numeral 100. The dual seal device 100 fits into a bore 12 in a housing 10 and a shaft 16. The housing 10 may optionally have a counterbore (not shown) to locate the dual seal 100 in the housing 10. The dual seal 100 includes a first shaft seal 20, a second shaft seal 30, a first support member 40, a second support member 50, a cavity 60 between the first support member 40 and the second support member 50, a channel 70 and a vent hole 80. The shaft 16 is disposed in the bore 12. The outer surface 17 of the shaft 16 has a first wear surface 18 adjacent to the first seal 20 and a second wear surface 19 adjacent to the second seal 50.

The first shaft seal 20 includes an end portion of the first support member 40, and a frusto-conical elastomeric seal body generally designated as 22. The frusto-conical elastomeric seal body 22 is preferably formed with a generally air side surface portion 24, a generally fluid side surface portion 26 and a seal band surface 27. The surface 27 extends generally axially between the radially inner most edges of the surfaces and, depending on whether it is in a relaxed or installed condition, being either cylindrical or slightly frusto-conical. There is an annular groove 28 adjacent to the seal band surface 27 for receiving an annular garter spring 29, as is conventional in the seal art. The frusto-conical seal surface's relatively steeply inclined fluid side surface 26 meets the less steeply inclined air side surface 24 to form the generally circular seal band 27, which cooperates with the first wear surface 18 of the outer surface 17 of the shaft 16 to form a first dynamic shaft seal 20. The first shaft seal 20 has a first radially extending portion adjacent to the fluid side surface portion 26. The first fluid side is in the first fluid region 102 which contains the first fluid.

The second shaft seal 30 includes an end portion of the second support member 50 and an elastomeric seal body generally designated as 32. The seal body 32 is similarly constructed as the first shaft seal 20 and has an air side surface portion 34, a generally fluid side surface 36 and a circular seal band surface 37 with a groove 38, for receiving an annular garter spring 39. The frusto-conical fluid side surface 36 meets the less steeply inclined air side surface 34 to form the seal band 37 which cooperates with the second wear surface 19 of the outer surface of the shaft 16 to form a second dynamic shaft seal 30. The second shaft seal 30 has a second radially extending portion which is adjacent to the fluid side surface portion 36. The second fluid side is in the second fluid region 104 which contains the second fluid. The first fluid is separated from the second fluid.

Each seal 20, 30 preferably has a relatively circular inner surface on the seal band surfaces 27, 37, respectively, to form a plain lip type seal that fits tightly around the shaft 16. Alternatively, each seal 20, 30 may have a plurality of hydrodynamic vanes or ribs which are angularly formed on the air side surfaces 24, 34, respectively. As the shaft 16 rotates, the seal band or the hydrodynamic action of the vanes creates a pumping action which is effective in returning any slight layer of fluid formed between the first seal band surface 27 and the first wear surface 18 into the interior of the first sealed region 102 and any slight layer of fluid formed between the second band surface 37 and the second wear surface 19 into the interior of the second sealed region 104. With both seals 20, 30 pumping in such a manner, with or without the hydrodynamic vanes, and as rotation continues particularly after a finite duration of moderate to high speed operation, the ingestion of first fluid from the first sealed region 102 and the second fluid from the second sealed region 104 beneath the lip in the area between the seal band surfaces 27, 37, respectively, creates a partial vacuum in the annulus 90, as will be discussed later on. If this effect is allowed to continue to occur, it results in accelerated wear of the inner surface or the edge of the seal bands 27, 37, or alternatively, the hydrodynamic vanes, because each is urged on to the wear surfaces 18, 19, respectively, with greater force than is required. With time the inner surface of the seal bands of the plain lip type seal or, optionally, the hydrodynamic vanes wear and the seals 20, 30 are no longer capable of pumping as effectively as when the seals 20, 30 were new and ultimately some fluid leaks from either region 102 or region 104 into the annulus 90 which is formed between the first seal 20, the second seal 30 and the shaft 16.

The first support member 40 has a generally hook-like shape which includes a first radial portion 42 adjacent to the first seal 20, a first radially and axially divergent portion 44 connected to the portion 42 on one end and to a radially and axially convergent portion 46 at the other end. The convergent portion 46 has a radially extending bump 47 for a purpose to be described later on and an axially extending portion 48.

The second support member 50 also has a generally hook-like shape but oppositely configured (that is substantially a mirror image) to that of the first support member 40. Thus the second support member 50 has a second radial portion 52 adjacent to the second seal 30 and spaced apart from the first radial portion 42. A first radially and axially divergent portion 54 connected at one end to the portion 52 and to a radially and axially convergent portion 56 at the other end. The convergent portion 56 has an axially extending portion 59 which overlaps the axially extending portion 48 of the first support member. The axially extending portion 58 forms the outer diameter 59.

Between the first support member 40 and the second support member 50, an internal cavity 60 is formed. The cavity 60 has a lower diverging section formed by radially and axially divergent portions 44, 54, and an upper converging section formed by radial and axially convergent portions 46, 56 to form a divergent and convergent shaped cavity 60. A vent hole 80 is formed in the housing 10 which is in flow communication with a hole 49 in the first axially extending flat portion 48. Optionally, the portion 48 may be partially closed off but not completely closed off by the portion 59 to prevent the migration of dirt into the cavity 60. The vent hole 80 is in flow communication with the cavity 60 through the hole 49 and the atmosphere A. The outside surface of the first support member 40 is covered with an elastomeric layer 21 except over portion 48 and the bump 47. Optionally, the bump may be partially covered with rubber. Similarly, the outside surface of the second support member 50 is covered with an elastomeric layer 31 except for portion 58 and the outer diameter 58.

Between the first radial portion 42 and the second radial portion 52 a channel 70 is formed. The channel 70 is formed by at least one partial hole in the first shaft seal 30 and at least one partial hole in the adjacent second shaft seal 40. Preferably, one to eight channels 70 are formed between the seal band surfaces 27, 37, respectively. The channel 70 is in flow communication with the cavity 60. Optionally, the channel 70 may be formed by locking the first support member 40 and the second support member 50 together in an axial predetermined distance by forming an undercut or positive stop 57 in the bottom surface of the first seal 20 which creates a gap between the seals 20, 30.

As stated earlier, the first shaft seal 20 and the second shaft seal 30 are normally spaced apart axially along the shaft 16 to form the annulus 90. The annulus 90 is in flow communication with the channel 70 which in turn is in flow communication with the cavity 60, hole 49 and the vent hole 80 and in flow communication with the atmosphere A. This is called the "flow function" which includes both the venting and draining modes. Thus, when the seals 20, 30 are new, a vacuum condition in the annulus 90 is prevented from forming by the flow function. When the seal band surfaces 27, 37 or the hydrodynamic vanes wear away and fluid leaks past the seals 20, 30, respectively, the flow function drains any fluid that accumulates in the annulus 90 between the seal band surfaces 27, 37 and the shaft 16.

The elastomeric seals 20, 30 and elastomeric layers 21, 31 are preferably made from the same polymeric material such as fluorocarbon, nitrile, ethylene acrylate, polyacrylate, nitride, hydrogenated nitrile, silicone, fluoropolymer, fluorosilicone, TPV and TPE or any other similar material that is suitable for the application. Optionally, the elastomeric seals 20, 30 and the elastomeric layers 21, 31 may each be made of different polymeric materials listed above. Further optionally, each of the elastomeric seals 20, 30 may be made of different polymeric material listed above, such as, for example, PTFE lips with a rubber outer diameter.

Only portions 46, 56, respectively, of the support members 40, 50 are covered with an elastomeric layers 21, 31. Thus, the outer diameters of the second support member, the portions 48, 59 and the bump 47 may be partially covered with an elastomeric layer or optionally, not covered with an elastomeric layer. The axial portion 59 is contiguous to the bore 12 and the housing 10. The elastomeric layers on the outer diameter of the portions 46, 56, respectively, form static seals with the bore 12 to prevent the migration of fluid from the first fluid region 102 to the vent hole 80 and the migration of fluid from the second fluid region 104 to the vent hole 80. The bump 47 and the overlapping axial portion 58 and axial portion 48 function to assist the dual seal 100 in retention in the bore 12 and to reduce spring back of the dual seal 100 in the housing 10.

Typical fluids used in the application are gear oil, automatic transmission fluid (ATF), ATF type 1, ATF type 2, gear oil type 2 or, alternatively, the same fluid on both sides of the dual seal 100 where separation is needed because of the application or contamination requirements.

The height of the dual seal 100 above the surface of the shaft 16 is designated the radial distance R and the axial distance or width of the dual seal 100, which includes the elastomeric layers 21, 31, is designated the axial distance d. The ratio of R/d is less than 1.5 and preferably less than 1.0.

While the present invention has been described in connection with a preferred embodiment, it is not intended to limit the invention to that embodiment only. On the contrary, it is intended to cover all alternative modifications and equivalents that may be included within the spirit and scope of the invention as defined by the drawings and the appended claims.

We claim:

1. A dual seal for a shaft, said dual seal comprising:
   a first support member;
   a second support member adjacent to said first support member, said first and second support members having portions forming an inner cavity;
   at least one channel member between said first and second support members, said at least one channel member in flow communication with said inner cavity;
   a first shaft seal member adjacent to said first support member opposite said inner cavity, with the first shaft seal member having at least one partial hole;
   a second shaft seal member adjacent to said second support member opposite said inner cavity and having at least one partial hole such that said one partial hole of said first shaft seal member and said one partial hole of said second shaft seal member form a portion of said channel member, said first and second shaft seal members forming an annulus between said first shaft seal member and said secnd shaft seal member and the shaft, said annulus is in flow communication with said at least one channel member so that said at least one channel member permits any accumulated fluid in said annulus to drain into said inner cavity thereby preventing the formation of vacuum in said annulus and preventing said first shaft seal member from abutting the second shaft seal member to block flow in said at least one channel member.

2. A dual seal as claimed in claim 1 wherein said first and second support members are interlocked axially together.

3. A dual seal as claimed in claim 1 wherein said inner cavity is formed by a pair of radial portions, a pair of diverging sections and a pair of converging portions, one of said pair of converging portions having a vent hole.

4. A dual seal as claimed in claim 4 wherein said at least one channel preventing each of said pair of radial portions from abutting each other and wherein said first support having a bump.

5. A dual seal as claimed in claim 3 wherein a portion of the outer diameter of said converging portion is coated with an elastomeric layer and wherein said radial distance from said shaft surface to the outer diameter is a distance R.

6. A dual seal as claimed in claim 3 wherein each of said pair of diverging portions having a first diverging portion adjacent but spaced away from said first shaft seal and a second diverging portion adjacent but spaced away from said second shaft seal, said first converging portion having a first converging portion adjacent said first diverging portion and a second converging portion adjacent said second diverging portion, said first diverging portion and said first converging portion forming a first joint, said second diverging portion and said second converging portion forming a second joint, said second joint axially spaced apart from said first joint.

7. A dual seal as claimed in claim 6 wherein said first and second joints are covered with an elastomeric layer, said first shaft seal member having a first radial portion and said second shaft seal member having a second radial portion, said fist and second radial portions having an axial distance d, the ratio of R/d is less than 1.5.

8. A dual seal as claimed in claim 6 wherein said inner cavity having a convergent-divergent shape and said first shaft seal being a frusto-conical type.

9. A dual seal as claimed in claim 1 wherein said first support member having a first axially extending portion and said second support member having a second axially extending portion, said first axially extending portion contiguous to said second axially extending portion to bias said first shaft seal member axially away from said second shaft seal member.

10. A dual seal for a shaft, the shaft being disposed in an annular bore formed in a housing:
    a pair of support members disposed in the housing, said pair of support members forming an inner cavity and each of said pair of support members having a radial portion and an axially extending portion with one of said pair of axially extending portions having an elastomeric layer to engage the bore in the housing;
    a pair of shaft seal members disposed around the shaft, each of said pair of shaft seal members attached to one of said pair of support members, said pair of shaft seal members each including partial holes forming an annulus between each of said pair of shaft seal members; and
    a channel member connecting said annulus with said inner cavity for flow communication between said annulus and said inner cavity, said channel member providing flow communication from said annulus to said cavity.

11. A dual seal as claimed in claim 10 wherein each said pair of support members having a radial portion covered by an elastomeric layer.

12. A dual seal as claimed in claim 11 herein said elastomeric layer is formed of a polymeric material.

13. A dual seal as claimed in claim 12 wherein each of said seals and said elastomeric layer is formed of a polymeric material selected from the group consisting of fluorocarbon, nitrile, polyacrylate, HBNR, ethylene acrylate, silicone, fluoropolymer, fluorosilicone, TPV, and TPE.

14. A dual seal as claimed in claim 11 wherein said inner cavity having a convergent-divergent shape.

15. A dual seal as claimed in claim 10 wherein each of said shaft seal members having a sealing surface to prevent the migration of fluid across said sealing surface, said sealing members being formed of a polymeric material selected from the group consisting of fluorocarbon, nitrile, polyacrylate, HNBR, ethylene acrylate, silicone, fluoropolymer, fluorosilicone, TPV, TPE, and PTFE.

16. A dual seal as claimed in claim 10 wherein said support members include converging portions that are axially connected together to form a gap.

17. A dual seal as claimed in claim 16 wherein one of said converging portions has a portion forming a vent hole in flow communication with said inner cavity.

18. A dual seal as claimed in claim 10 wherein said one channel prevents said pair of scaling members from interfering with the flow through said channel.

19. A dual seal for a shaft, said dual seal comprising:

a first support member;

a second support member adjacent to said first support member, said first and second support members having portions forming an inner cavity having a pair of radial portions, a pair of diverging sections and a pair of converging portions, one of said pair of converging portions having a vent hole;

at least one channel member between said first and second support members, said at least one channel member in flow communication with said inner cavity;

a first shaft seal member adjacent to said first support member opposite said inner cavity;

a second shaft seal member adjacent to said second support member opposite said inner cavity, said first and second shaft seal members forming an annulus between said first shaft seal member and said second shaft seal member and the shaft, said annulus is in flow communication with said at least one channel member so that said at least one channel member permits any accumulated fluid in said annulus to drain into said inner cavity thereby preventing the formation of vacuum in said annulus and preventing said first shaft seal member from abutting the second shaft seal member to block flow in said at least one channel member; and wherein each of said pair of diverging portions has a first diverging portion adjacent but spaced away from said first shaft seal and a second diverging portion adjacent but spaced away from said second shaft seal, said first converging portion having a first converging portion adjacent said first diverging portion and a second converging portion adjacent said second diverging portion, said first diverging portion and said first converging portion forming a first joint, and said second diverging portion and said second converging portion forming a second joint, with said second joint axially spaced apart from said first joint.

* * * * *

UNITED STATES PATENT AND TRADEMARK OFFICE
CERTIFICATE OF CORRECTION

PATENT NO.   : 6,561,519 B1
DATED        : May 13, 2003
INVENTOR(S)  : Christopher C. Frese and Tigree M. Butcher It is certified that error appears in the above-identified patent and that said Letters Patent is hereby corrected as shown below:

Column 5,
Line 33, "Rid" should read -- R/d --.

Column 6,
Line 66, "herein" should read -- wherein --.

Column 7,
Line 23, "scaling" should read -- sealing --.

Signed and Sealed this

Eighth Day of July, 2003

JAMES E. ROGAN
*Director of the United States Patent and Trademark Office*